US006830512B2

United States Patent
Tanis et al.

(10) Patent No.: US 6,830,512 B2
(45) Date of Patent: Dec. 14, 2004

(54) SHROUD FOR THE INFEED IMPELLER OF A ROTARY COMBINE

(75) Inventors: Dale R. Tanis, Geneseo, IL (US); Robert A. Matousek, Milan, IL (US); Jonathan E. Ricketts, Viiola, IL (US); Glenn E. Pope, Viiola, IL (US); John L. Peters, Geneseo, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/198,838

(22) Filed: Jul. 19, 2002

(65) Prior Publication Data

US 2004/0023703 A1 Feb. 5, 2004

(51) Int. Cl.$^7$ .................................................. A01F 12/00
(52) U.S. Cl. ........................................... 460/68; 460/46
(58) Field of Search .............................. 460/46, 65, 68, 460/70, 119

(56) References Cited

U.S. PATENT DOCUMENTS

| 778 | A | * | 6/1838 | Wright ......................... 460/46 |
|---|---|---|---|---|
| 4,291,709 | A | * | 9/1981 | Weber et al. .................. 460/70 |
| 4,665,929 | A | * | 5/1987 | Helm ........................... 460/67 |
| 5,145,461 | A | * | 9/1992 | Tanis ............................ 460/68 |
| 5,145,462 | A | * | 9/1992 | Tanis et al. ................... 460/68 |
| 5,257,959 | A | * | 11/1993 | Tanis ............................ 460/68 |
| 5,387,153 | A | * | 2/1995 | Tanis ............................ 460/68 |
| 5,562,540 | A | * | 10/1996 | Balmer ......................... 460/68 |
| 6,050,894 | A | * | 4/2000 | Johnson ........................ 460/68 |
| 6,129,629 | A | * | 10/2000 | Dammann et al. ............ 460/67 |
| 6,241,605 | B1 | * | 6/2001 | Pfeiffer et al. ................ 460/69 |
| 6,296,566 | B1 | * | 10/2001 | Tanis et al. ................... 460/70 |
| 6,352,474 | B1 | * | 3/2002 | Payne et al. .................. 460/66 |

* cited by examiner

Primary Examiner—Thomas B. Will
Assistant Examiner—Nathan Mammen
(74) Attorney, Agent, or Firm—Brant T. Maurer; Rebecca Henkel

(57) ABSTRACT

A shroud for the infeed section impeller in a rotary combine. The shroud includes a rear converging wall cone and a front diverging wall cone. A feed plate extends transversely across the front of the shroud and a sump is formed in the shroud behind the feed plate. The front diverging wall cone comprises top and bottom, rearwardly diverging walls. Transitions castings separate the top and bottom walls on left and right sides and have rearwardly converging front faces.

7 Claims, 5 Drawing Sheets

SHROUD FOR THE INFEED IMPELLER OF A ROTARY COMBINE

FIELD OF THE INVENTION

The present invention relates generally to agricultural combines. It relates particularly to rotary combines and, more particularly, to the rotor assembly in a rotary combine.

BACKGROUND OF THE INVENTION

A well-known form of harvesting machine is a rotary combine. A typical combine includes a crop harvesting header assembly which reaps grain stalks and feeds the grain stalks to a rotary threshing assembly. The grain stalks or other crop materials harvested in the field are moved rearwardly from the crop harvesting header assembly by a crop feeder assembly and introduced for threshing to the rotary threshing and separating assembly.

In a rotary combine, the rotary threshing and separating assembly includes a generally tubular rotor housing mounted in the combine body. A driven rotor is coaxially mounted within the housing. The rotor comprises a frustoconical infeed section and a cylindrical threshing and separating section, and is supported at opposite ends by front and rear bearings.

The cylindrical threshing and separating section of the rotor, and its surrounding rotor housing, mount cooperating threshing elements which thresh grain from other material in a threshing zone. The crop material is threshed and separated as it spirals around the rotor threshing section, and separated grain passes through openings in the surrounding rotor housing.

As discussed in Tanis, U.S. Pat. No. 5,387,153, and Tanis et al., U.S. patent application Ser. No. 09/412,468, assigned to the same assignee as the present invention, the ability to transfer crop materials from the feeder assembly to the threshing zone of the rotor assembly is critical to efficient combine operations. Most rotary combine rotors include an infeed section impeller comprised of a series of impeller blades arranged at a forward end of the rotor. The impeller blades rotate within a shroud which is a forward part of the rotor housing. During harvesting operations, the generally linear movement of the crop materials received from the feeder assembly is converted by the rotating impeller blades into a rotating, circulatory movement, in a rearward and outward direction.

In the Tanis et al. application, a new and improved impeller blade construction and arrangement is disclosed. The present application relates specifically to the construction and arrangement of the shroud which encloses the impeller. In that sense, the shroud of the present invention finds particularly advantageous application with the impeller disclosed in the aforementioned Tanis et al. application.

SUMMARY OF THE INVENTION

It is an object of the invention to provide a new and improved shroud for the infeed section impeller of the rotor in a rotary combine.

It is another object to provide a shroud whose geometry results in a crop delivery pattern which substantially eliminates localized areas of intensive crop pressure against the working surfaces of the rotor and rotor housing.

It is still another object to provide an infeed section shroud which enhances throughput capacity of the combine.

It is a further object to provide an infeed section shroud which controls crop flow in a manner which improves the energy efficiency of the rotor operation.

It is yet another object to provide an infeed section shroud which controls crop flow in a manner which improves component wear life.

The foregoing and other objects are realized in an infeed section shroud which combines a rear converging wall cone and a front diverging wall cone. The diverging wall cone or "reverse" cone diverges from a crop inlet opening at the front end of the shroud to its junction with the converging cone. The opposed cones or, more precisely, frustums of cones, enclose the impeller blades on the infeed section impeller of the rotor. The reverse cone is interrupted on one side by a transition member and a reverse transition member which, together, extend angularly around the axis of the impeller from about the 2:30 o'clock position, to about the 5:30 o'clock position as viewed from the front of the combine.

From the aforementioned (about) 5:30 o'clock position to about the 7:30 o'clock position the reverse cone continues and forms a sump behind a horizontal feed plate assembly of the shroud. From this 7:30 o'clock position to about the 9:00 o'clock position the reverse cone is again interrupted. At the 9:00 o'clock position the reverse cone is restored in the form of a reverse cone support member which supports and mounts a reverse cone rotor door extending over the top of the shroud to the aforementioned 2:30 o'clock position.

The rear, converging wall cone is mounted on a cylindrical housing member which mates with the cylindrical housing for the threshing rotor. The trailing edges of the impeller blades and the rear of the impeller itself extend into this cylindrical housing member. Arranged in helical paths extending circumferentially within the converging wall cone is a series of at least three crop directing vanes.

Similarly, arranged in helical paths extending circumferentially within the cylindrical housing member is another series of at least three crop directing vanes. The vanes extend radially inwardly to inner edges which are spaced only a short distance from the traces defined by the outer edges of the impeller blades as they rotate.

Crop material is fed into the shroud through a horizontal feed opening in the front face of the front diverging wall cone. A mat of crop material is fed up over an inlet ramp by the feed conveyor. This mat falls into the shroud's sump where it is picked up by the rotating impeller blades and carried in a counter-clockwise direction (viewed from the front) onto the rear, converging wall cone. The vanes lead and separate the crop mat into three continuous rows of crop material which are moved rearwardly in helical patterns into the threshing section of the rotor assembly.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
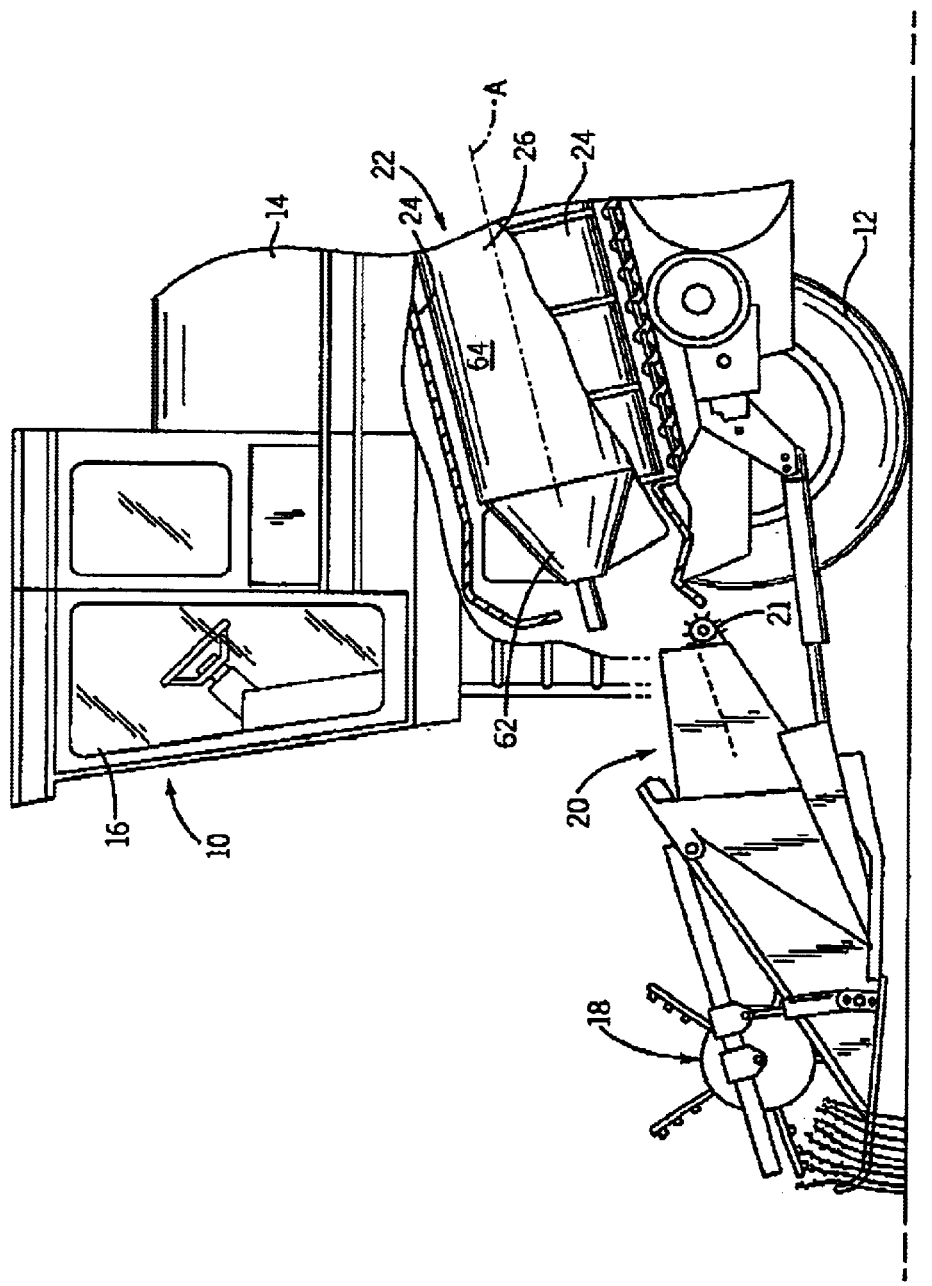
FIG. 1 is a side elevational view of a portion of a rotary combine showing, in partial section, a crop feeder assembly and a rotor assembly including a rotor housing with an impeller shroud embodying features of the invention.

Referring now to the drawings, and particularly to FIG. 1, a self-propelled rotary combine is seen generally at 10. The combine 10 includes a body 14 supported by front wheels 12 (the rear wheels are not shown). The combine 10 also includes an operator's cab 16.

The combine 10 is powered by an engine (not shown), suitably supported within the body 14. The transfer of power from the engine to various driven components of the combine is effected conventionally.

The combine 10 is provided with a crop harvesting header assembly 18 for cutting and gathering crop materials. The header assembly 18 cuts and directs crop materials into a crop feeder assembly 20, including a conveyor 21. The conveyor 21 carries crop materials in a layer or mat toward a rotor assembly 22, which receives and threshes the grain from materials other than grain (MOG).

The rotor assembly 22 is supported in a conventional manner inside the body 14. The rotor assembly 22 includes a cylindrical rotor housing 24 mounted in a fore-and-aft direction in the body 14. A rotor 26 is mounted coaxially within the rotor housing 24, for rotation on the axis A.

Figure 2:
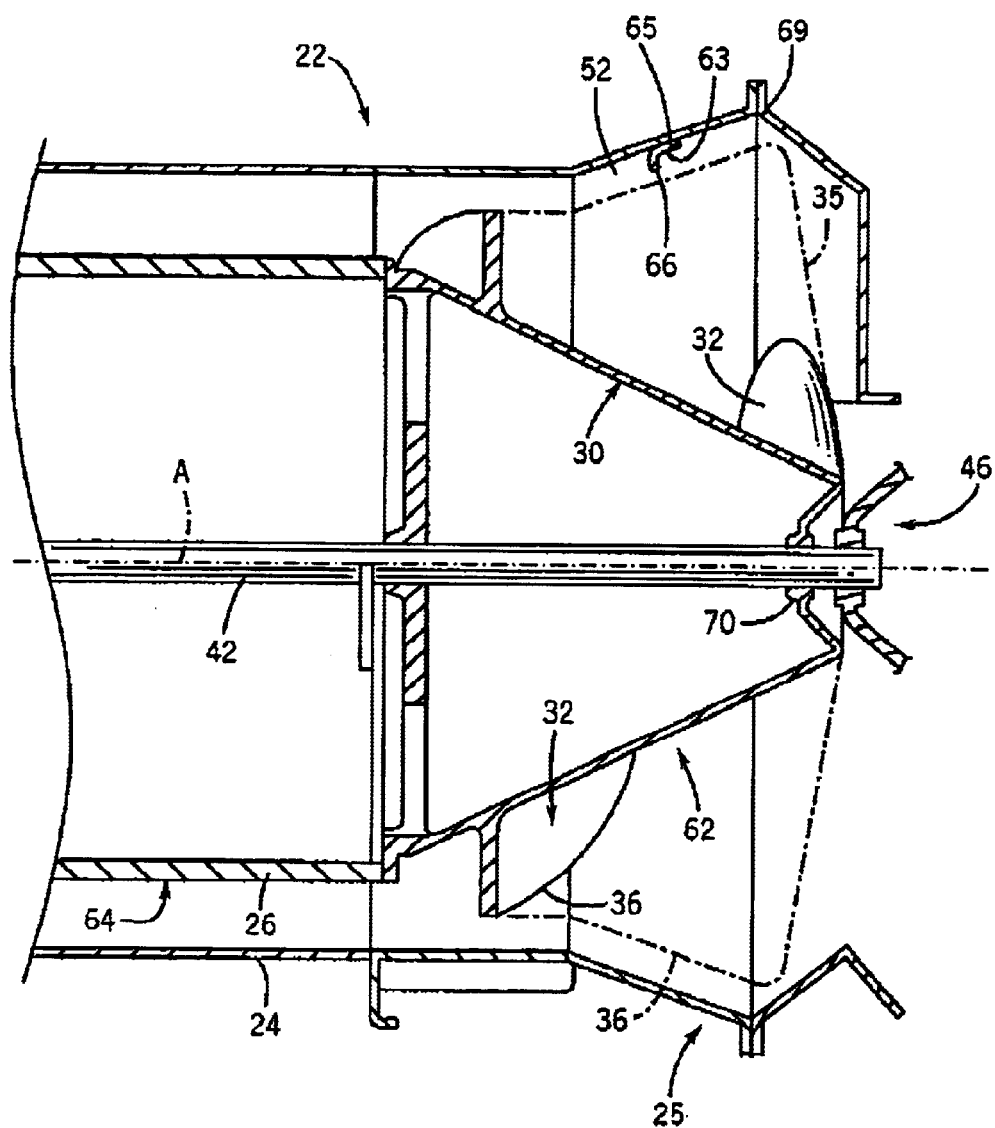
FIG. 2 is an enlarged sectional view of the impeller and impeller shroud seen in FIG. 1.

Referring also to FIG. 2, the rotor 26 is a hollow drum rigidly affixed to a shaft 42 extending coaxially through it. The rotor 26 includes an infeed section 62 and a threshing section 64. The infeed section 62 comprises an impeller 30 including a cone-shaped impeller body 31 having two impeller blades 32 extending outwardly therefrom.

At its forward end, the rotor housing 24 includes an impeller shroud 25 embodying features of the present invention. The shroud 25 partially encloses the impeller 30 and cooperates with it in feeding the crop material radially and circumferentially into the threshing section 64 in the manner hereinafter described.

The two identical impeller blades 32 are equally spaced from each other around, and extend radially outwardly from, the impeller body 31. The impeller 30 may comprise more than two blades 32. Preferably, the configuration and arrangement of the blades 32 is that described in the aforementioned Tanis et al. application.

As best seen in FIG. 2, each impeller blade 32 has a leading edge 35 and an outer edge 36. The trace generated by the outer edge 36 of each of the two impeller blades 32 during rotation of the impeller 30 approximates the frustum of a cone having a cone angle which is substantially equal to that of the adjacent shroud 25. Accordingly, a narrow, annular space 52 is defined between the outer edges 36 of the impeller blades 32 and the inner surface of the adjacent shroud 25. As the impeller 30 rotates it moves crop material rearwardly toward the threshing section 64 through this space 52 in a manner hereinafter discussed.

As previously pointed out, the rotor 26 is fixed to the shaft 42, which supports the rotor 26 for rotation with the shaft on the axis A. The shaft 42 is rotatably supported in the combine body 14 at its front end in a bearing assembly 46.

Figure 3:
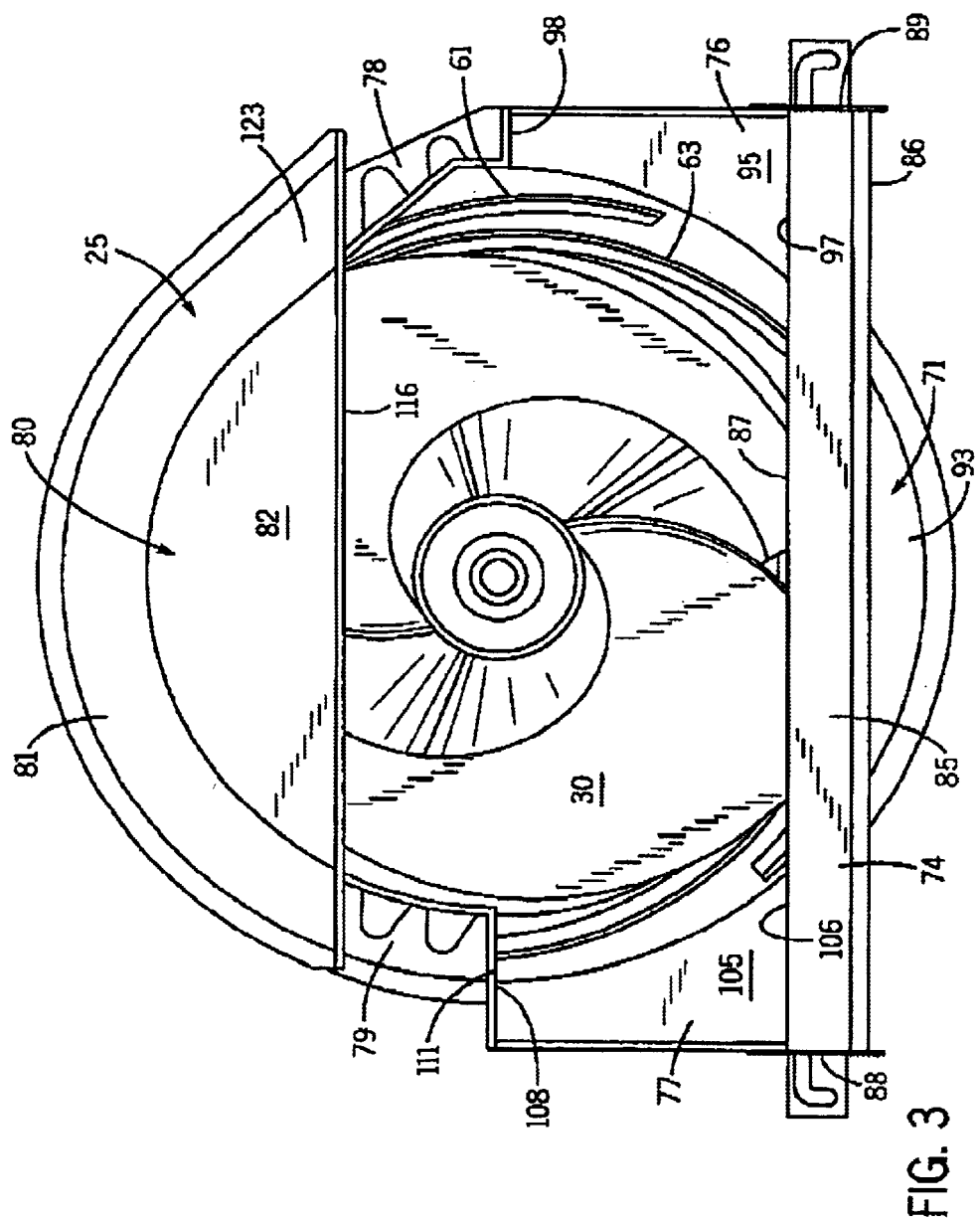
FIG. 3 is a front elevational view of the impeller and impeller shroud seen in FIGS. 1 and 2, with parts removed.
Figure 4:
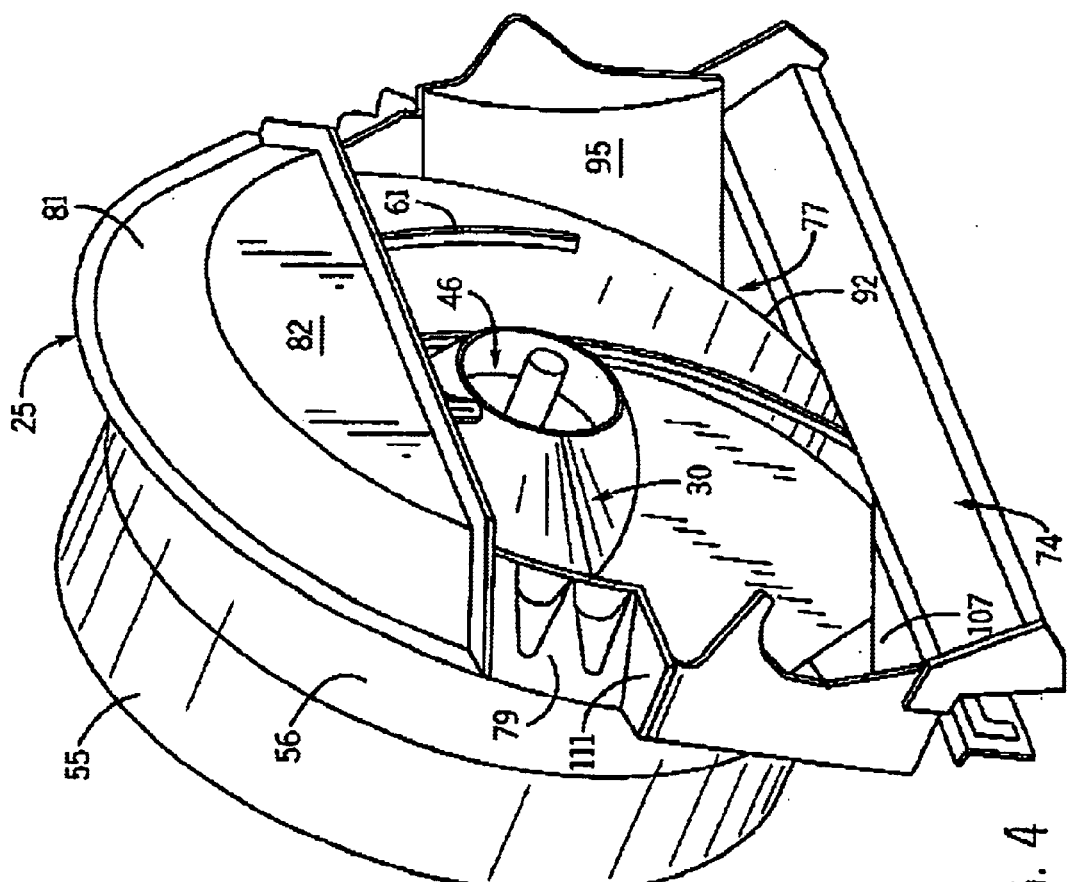
FIG. 4 is a front perspective view of the impeller and impeller shroud seen in FIG. 3.

Referring now also to FIGS. 3 and 4, the shroud 25 and the impeller 30 are shown independently of the rest of the rotor assembly 22. The shroud 25 encloses the impeller 30 circumferentially and over a portion of its front end. The shroud 25 is welded or bolted to the cylindrical rotor housing 24, at the rear of the shroud.

Figure 5:
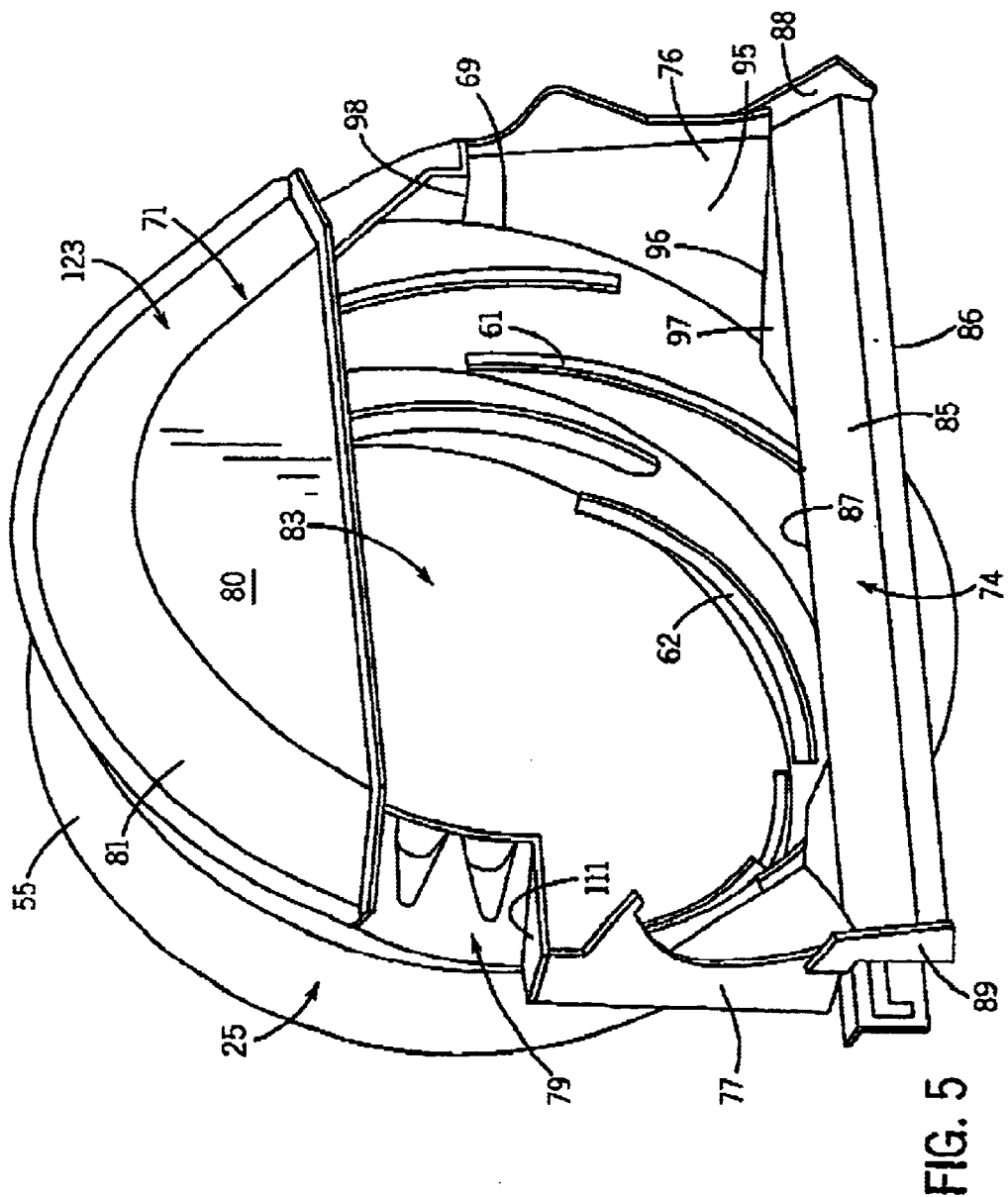
FIG. 5 is a perspective view of the impeller shroud embodying features of the invention, with the impeller removed.

Referring additionally to FIG. 5, the shroud 25 is seen with the impeller 30 removed. The shroud 25 includes a cylindrical segment 55 immediately adjacent the cylindrical rotor housing 24. Welded to the front end of the cylindrical segment 55 is the rear frusto-conical segment 56 of the shroud 25, i.e., the converging wall cone of the shroud. The rear frusto-conical segment 56 diverges as it extends forwardly to the point where the trace of each of the impeller blades 32 abruptly turns inwardly (as seen in FIG. 2).

Two rows 61 and 62 of transport vanes 63 are mounted inside the rear, frusto-conical segment 56 and the cylindrical segment 55 of the shroud 25, respectively. Three vanes 63 are evenly spaced around the inside of the segment 56. Three vanes 63 are evenly spaced around the inside of the segment 55.

Each of the vanes 63 in the rows 61 and 62 comprises a right angle (cross section) element curved in a helical path to follow the surface of the segment 56. Each vane 63 element includes a base 65 fastened to the inside of the corresponding shroud segment and a right angle wall 66 extending inwardly of that base. As seen in FIG. 2, the free inner end of the wall 66 of each vane 63 is spaced only a slight distance from the trace of each blade 32.

The rear, frusto-conical segment 56 of the shroud 25 has a circular leading edge 69. Fastened to this circular leading edge 69, by welding or bolts, is the inlet assembly 71 of the shroud 25.

The inlet assembly 71 of the shroud 25 includes a feed plate sub-assembly 74, left and right (facing forwardly of the combine 10) transition castings 76 and 77, left and right reverse transition castings 78 and 79, and a door 80 including a reverse frusto-conical door segment 81 and a front closure panel 82. A horizontally elongated crop inlet 83 is defined between the feed plate sub-assembly 74 and a lateral beam (not shown) which supports the rotor front bearing and which abuts the lower edge of the door segment's front closure panel 82.

The feed plate sub-assembly 74 comprises an inlet ramp 85. The inlet ramp 85 is inclined upwardly and rearwardly from its lower leading edge 86 to its trailing upper edge 87. Vertical end plates 88 and 89 support the ramp 85 and are bolted to the bearing support structure for the rotor assembly 22 in a manner not shown.

Immediately behind the trailing upper edge 87 of the ramp 85, the inlet assembly 71 contains a sump 92. The sump 92 is formed by a reverse frusto-conical floor segment 93 below the trailing edge 87 of the ramp 85. The floor segment is fastened to the leading edge 69 of the shroud assembly segment 56, where it extends in a circular path below the level of the ramp edge 87.

Bracketing the crop inlet opening 83, immediately above the feed plate sub-assembly 74, are the transition castings 76 and 77. These castings 76 and 77 form rearwardly converging sides for the inlet opening 83.

The left transition casting 76 includes a face plate 95 which converges toward the axis of the impeller 30 as it extends rearwardly toward the circular leading edge 69 on the shroud segment 56. The face plate 95 terminates at its lower edge 96 on a shelf 97 which brackets (on one side) the sump 92. At its upper edge 98 the face plate 95 joins the left reverse transition casting 78, which bridges the gap between the face plate 95 and the reverse frusto-conical door segment 80.

The right transition casting 77 also includes a face plate, in this case at 105. The face plate 105 also converges toward the axis of the impeller 30 as it extends rearwardly toward the circular leading edge 69. The face plate 105 terminates at its lower edge 106 on the shelf 107 which brackets (on the other side) the sump 92. At its upper edge 108, however, the face plate 105 joins the right reverse transition casting 79 in a manner different from the left side. Here, a horizontal bridge plate 111 connects the edge 108 to the right reverse transition casting 79.

The reverse transition casting 79 serves as a support frame for the door 80 at its right end. In this regard, the casting 79 is bolted to the frusto-conical segment 56 of the shroud 25. The door segment 81 is, in turn, bolted to the casting 79.

The door panel 82 has a horizontal, lower edge 116 which abuts a lateral beam (not shown), the lower edge of which defines the top limit of the crop inlet opening 83. The door 80 also includes a side wall portion which flattens out on its left side, as at 123.

Returning now to the left reverse transition casting 78, and the door 80 where it overlaps the casting 78 at 123, it will be seen best in FIG. 3 that the casting 78 is also flat where it underlies and supports this left side wall portion 123 of the door segment 81. As such, the door segment 123, although inclined inwardly, from back-to-front, extends outwardly of the circumference defined by the leading edge 69 of the shroud segment 56.

In operation of the combine 10 incorporating an impeller shroud 25 embodying features of the present invention, the conveyor 21 feeds crop material onto the inlet ramp 85 in a mat. The mat of crop material is forced over the trailing upper edge 87 of the ramp 85 by the conveyor 21 and falls continuously into the sump 92.

As the mat of crop material falls into the sump 92, it moves rearwardly on the frusto-conical floor segment 93 of the sump 92. At the base of the floor segment 93, the mat is engaged by the rotating impeller blades 32. The mat of crop material is driven sideways by the blades 32 and torn into linear segments. These linear segments of crop material engage transport vanes 63 in the first row 61 of vanes and are driven rearwardly in the annular space 52 by interaction of the vane and blades.

The impeller 30 is rotating in a counterclockwise direction, as viewed from the front. As the crop material rotates in that direction, and is carried out of the sump 92, it is captured beneath the flat reverse transition casting 78 and its overlying door segment, at 123. The left transition casting 76 front wall 95 prevents crop material from escaping as it comes out of the sump 92.

The vanes 63 are arranged in two rows 61 and 62. Each row comprises two sets of three vanes 63. They are placed to direct crop flow in a helical path which passes through the threshing section and over the threshing concaves (which are not shown) at least three times as it passes through.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In a rotary combine having a threshing assembly which includes a rotor housing and a rotor arranged for rotation within said rotor housing, wherein said rotor includes an infeed section and said infeed section has a frusto-conical impeller body with at least one impeller blade extending outwardly from said body, the improvement in an impeller shroud comprising:

a) a frusto-conical wall segment forming a rear converging wall encircling said impeller; and b) at plurality of front, reverse frusto-conical wall segments forming a front rearwardly diverging wall partially encircling said impeller, said front, reverse frusto-conical wall segments comprising a top wall segment and a bottom wall segment, and said top and bottom wall segments being separated by left and right transition elements which are rearwardly converging.

2. The improvement in an impeller shroud of claim 1 further characterized by one of said front, reverse frusto-conical wall segments having a panel depending therefrom and partially defining the top of a crop material inlet chamber.

3. The improvement in an impeller shroud of claim 2 further characterized in that:

a) said rear wall segment forms a rearwardly converging, uninterrupted wall encircling said impeller; and b) said front wall segments forms a rearwardly diverging, interrupted wall encircling said impeller.

4. The improvement in an impeller shroud of claim 1 further characterized by and including:

(a) a plurality of impeller blades counted on said impeller body; and (b) a plurality of vanes mounted inside said rear frusto-conical wall segment.

5. In a rotary combine having a threshing assembly which includes a rotor housing and a rotor arranged for rotation within said rotor housing, wherein said rotor includes an infeed section and said infeed section has a frusto-conical impeller body with at least one impeller blade extending outwardly from said body, the improvement in an impeller shroud comprising:

(a) a frusto-conical wall segment forming a rear converging wall encircling said impeller;

(b) a plurality of front, reverse frusto-conical wall segments forming a front diverging wall at least partially encircling said impeller;

(c) one of said front, reverse frusto-conical wall segments having panel depending therefrom and partially defining the top of a crop material inlet chamber;

(d) said front, reverse frusto-conical wall segments comprise a top wall segment and a bottom wall segment;

(e) said top and bottom wall segments being separated by left and right transition elements which are rearwardly converging; and (f) a sump in said shroud over said bottom wall segment.

6. A shroud for enclosing the impeller body and impeller blades on a rotor in a rotary combine, comprising:

(a) a rear frusto-conical wall encircling said impeller body and blades; and (b) upper and lower front, frusto-conical wall segments forming a rearwardly diverging wall partially encircling said impeller body and blades; and (c) left and right transition structures separating said upper and lower wall segments, said transition structures having rearwardly converging front faces.

7. The shroud of claim 6, further characterized in that;

(a) said upper and lower wall segments have a crop feeding opening therebetween.

* * * * *